(12) United States Patent
Cheon et al.

(10) Patent No.: US 12,516,312 B2
(45) Date of Patent: Jan. 6, 2026

(54) MAGNETIC PARTICLE FOR MODULATING ACTIVITY OF CELL

(71) Applicants: UIF (University Industry Foundation), Yonsei University, Seoul (KR); Institute for Basic Science, Daejeon (KR)

(72) Inventors: Jin Woo Cheon, Seoul (KR); Jae Hyun Lee, Seoul (KR); Jung Uk Lee, Seoul (KR)

(73) Assignees: UIF (University Industry Foundation), Yonsei University, Seoul (KR); INSTITUTE FOR BASIC SCIENCE, Daejeon (KR)

( * ) Notice: Subject to any disclaimer, the term of this patent is extended or adjusted under 35 U.S.C. 154(b) by 897 days.

(21) Appl. No.: 17/674,743

(22) Filed: Feb. 17, 2022

(65) Prior Publication Data
US 2022/0259583 A1 Aug. 18, 2022

(30) Foreign Application Priority Data

Feb. 17, 2021 (KR) .................. 10-2021-0021485
Feb. 17, 2022 (KR) .................. 10-2022-0020901

(51) Int. Cl.
*C12N 13/00* (2006.01)
*H01F 1/00* (2006.01)
*B82Y 25/00* (2011.01)
*C07K 14/705* (2006.01)

(52) U.S. Cl.
CPC ........... *C12N 13/00* (2013.01); *H01F 1/0054* (2013.01); *B82Y 25/00* (2013.01); *C07K 14/705* (2013.01)

(58) Field of Classification Search
CPC ....... C12N 13/00; H01F 1/0054; B82Y 25/00; C07K 14/705; C12M 47/04; C12M 35/06; C12M 35/00; C12M 25/16
See application file for complete search history.

(56) References Cited

U.S. PATENT DOCUMENTS

2009/0231073 A1   9/2009  Horisaka et al.
2012/0130149 A1   5/2012  Diament et al.
(Continued)

FOREIGN PATENT DOCUMENTS

JP      2001-222913     8/2001
KR    10-2011-0045732   5/2011
(Continued)

OTHER PUBLICATIONS

Kainz, Quirin M. and Oliver Reiser. "Polymer- And Dendrimer-Coated Magnetic Nanoparticles as Versatile Supports for Catalysts, Scavengers, and Reagents" Accounts of Chemical Reserach. vol. 47, Issue 2, pp. 667-677. (Year: 2014).*
(Continued)

*Primary Examiner* — Michael L Hobbs
(74) *Attorney, Agent, or Firm* — Sughrue Mion, PLLC

(57) ABSTRACT

The magnetic particle for modulating the activity of cells according to an exemplary embodiment of the present invention is capable of specifically binding to a bioactive material, and includes a core and a plurality of nanoparticles disposed on the surface of the core, and may generate a torque of 10 pN·nm or more when a rotating magnetic field of 5 mT is applied.

18 Claims, 18 Drawing Sheets

(56) References Cited

U.S. PATENT DOCUMENTS

| | | | |
|---|---|---|---|
| 2013/0195767 A1* | 8/2013 | Weissleder | A61N 2/02 |
| | | | 424/490 |
| 2020/0246629 A1 | 8/2020 | Weinberg et al. | |
| 2021/0376222 A1 | 12/2021 | Park et al. | |
| 2022/0257963 A1 | 8/2022 | Cheon et al. | |
| 2022/0257964 A1 | 8/2022 | Cheon et al. | |
| 2023/0145528 A1 | 5/2023 | Sun et al. | |

FOREIGN PATENT DOCUMENTS

| | | |
|---|---|---|
| KR | 10-2017-0003401 | 1/2017 |
| KR | 10-2019-0119203 | 10/2019 |
| WO | WO 2011/150212 | 12/2011 |

OTHER PUBLICATIONS

Fan et al., "Piezoluminescence from ferroelectric Ca3Ti2O7:Pr3+ long-persistent phosphor," Optics Express (2017) 25(13):14238-14246.

Song et al., "Development of Magnetic Torque Stimulation (MTS) Utilizing Rotating Uniform Magnetic Field for Mechanical Activation of Cardiac Cells," Nanomaterials (2020) 10:1684.

Lee et al., "Non-contact long-range magnetic stimulation of mechanosensitive ion channels in freely moving animals", Nature Materials, vol. 20, Jul. 2021, 1029-10361.

\* cited by examiner

[FIG. 1]
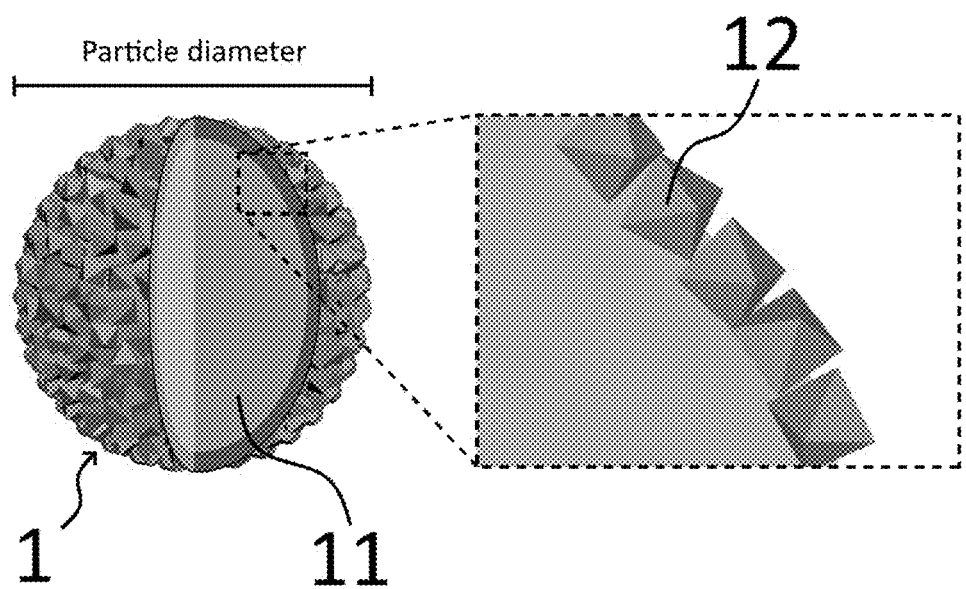

[FIG. 2]
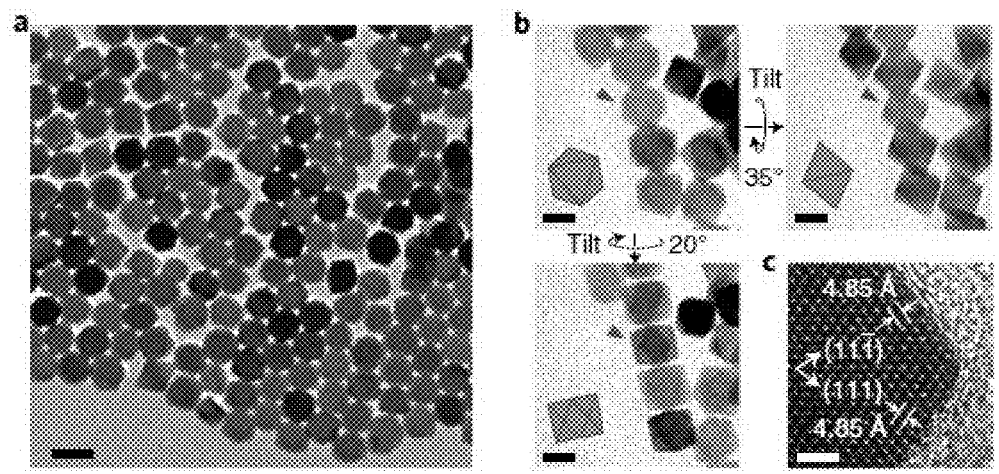

[FIG. 3]
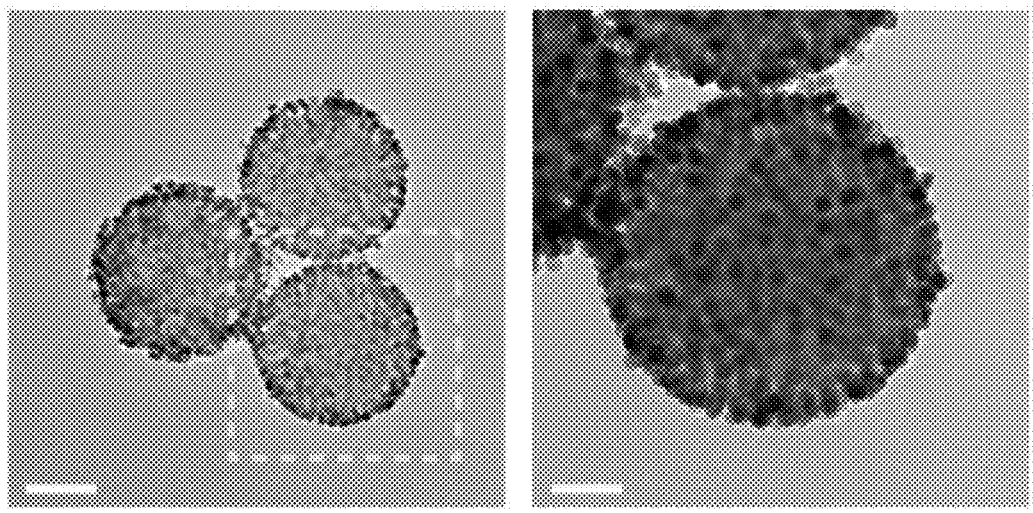

[FIG. 4]
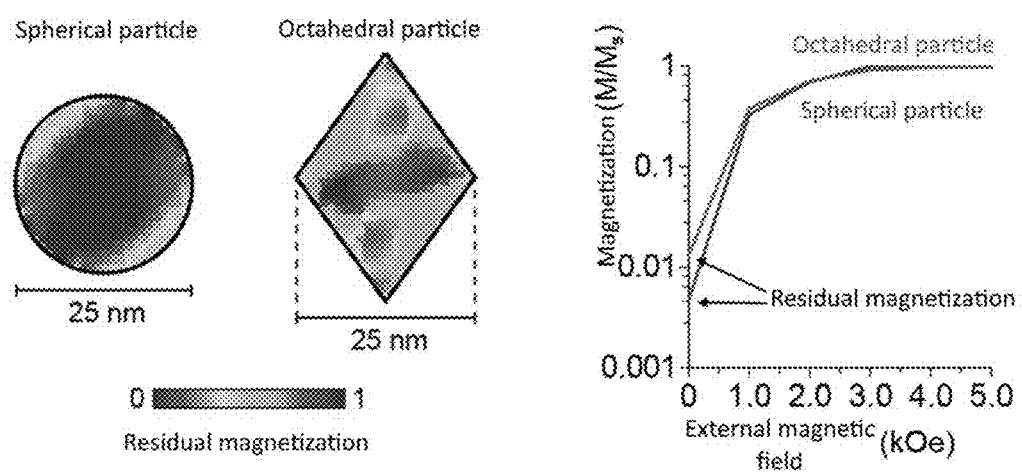

[FIG. 5]
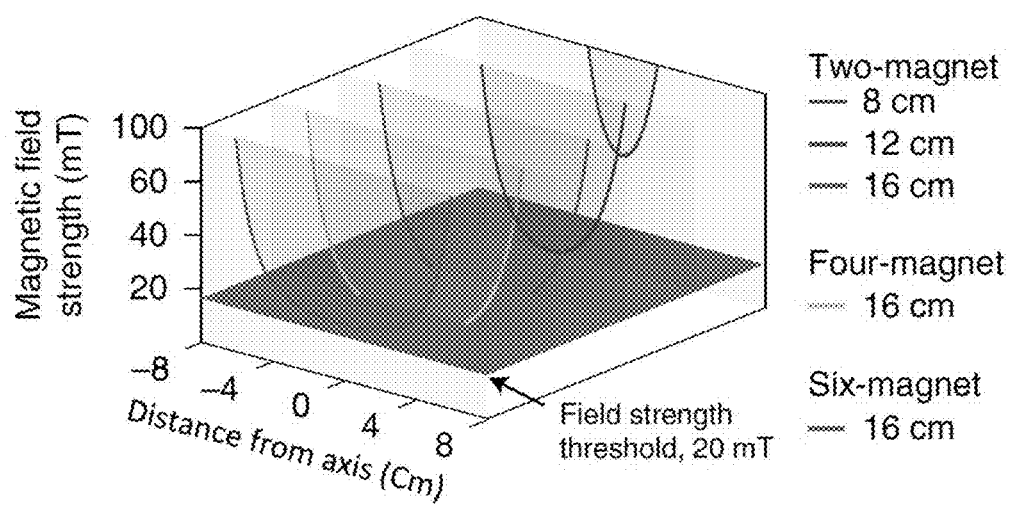

[FIG. 6]
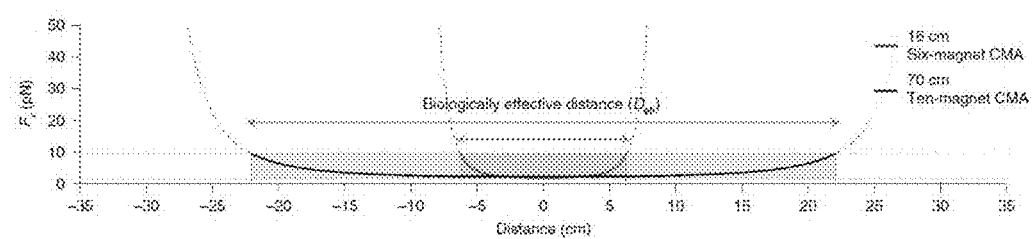

[FIG. 7]
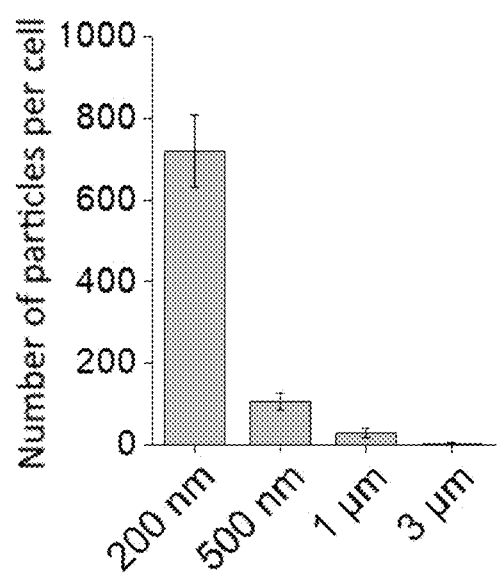

[FIG. 8]
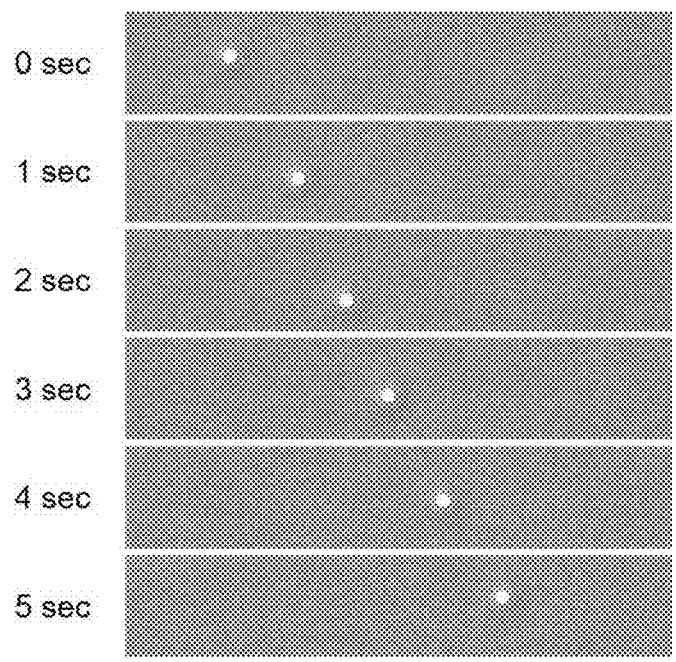

[FIG. 9]
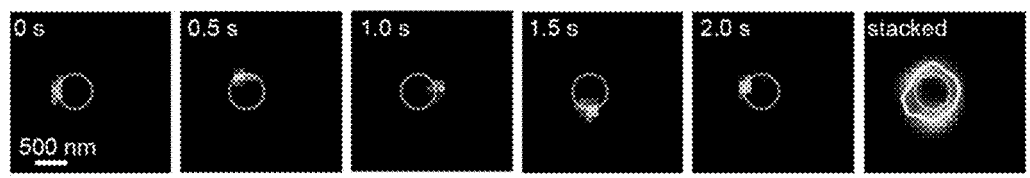

[FIG. 10]
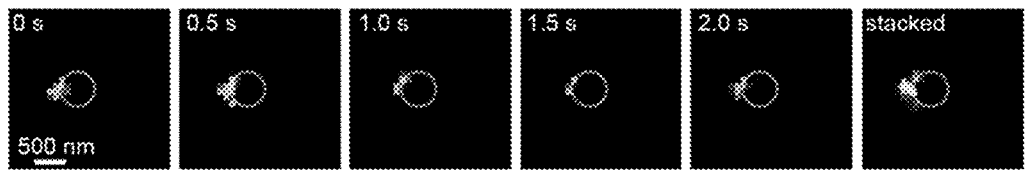

[FIG. 11]
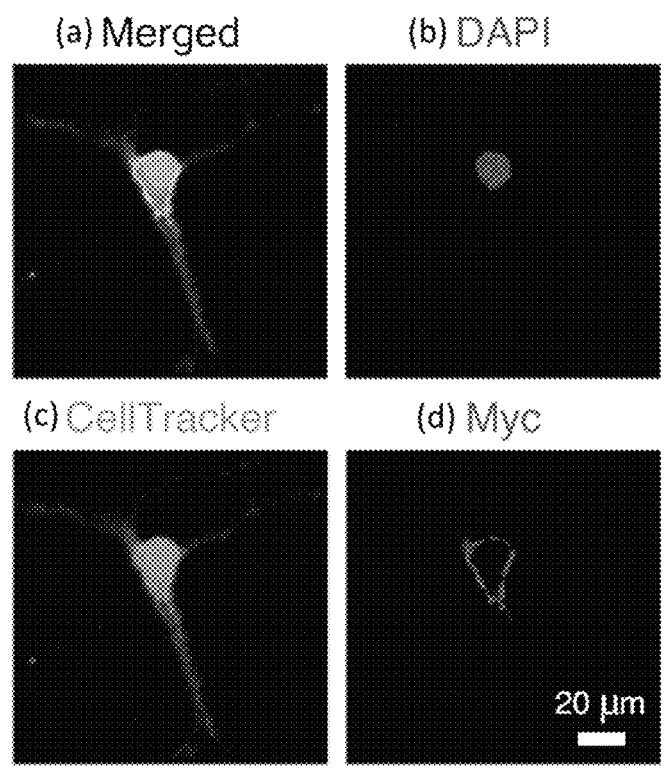

[FIG. 12]
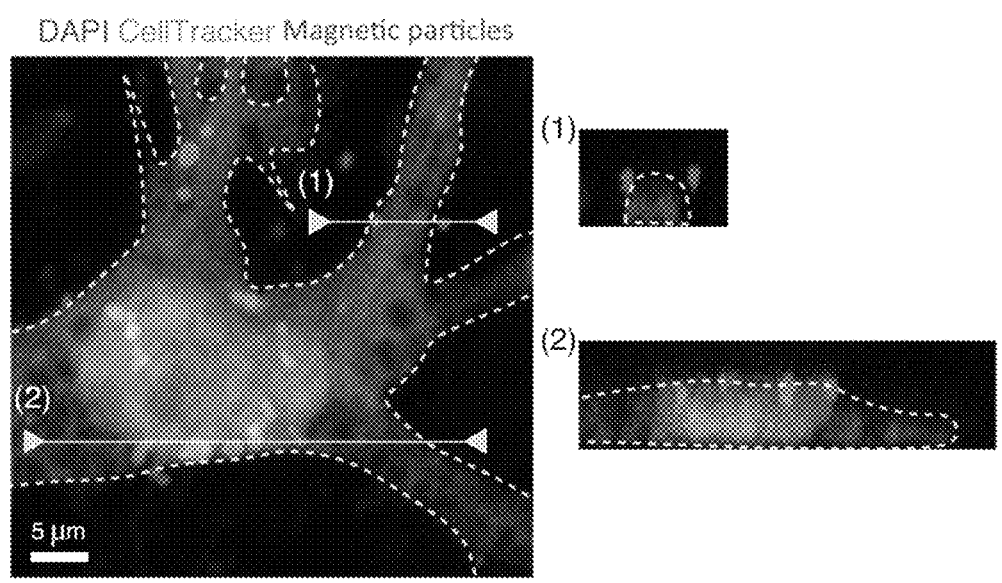

[FIG. 13]
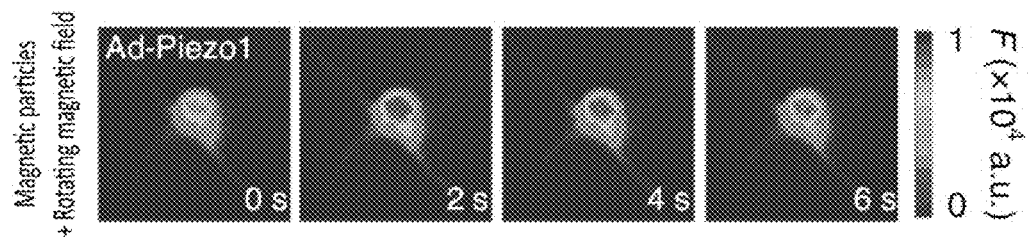

[FIG. 14]
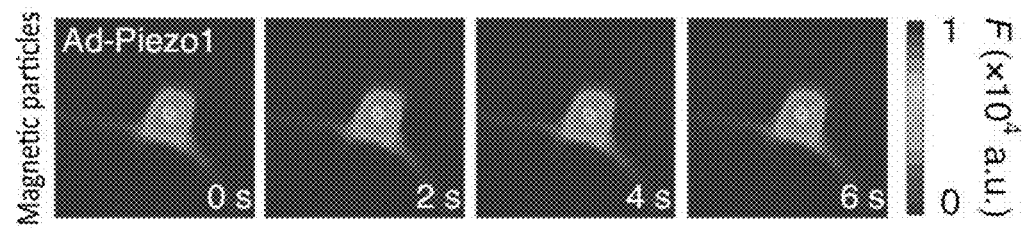

[FIG. 15]
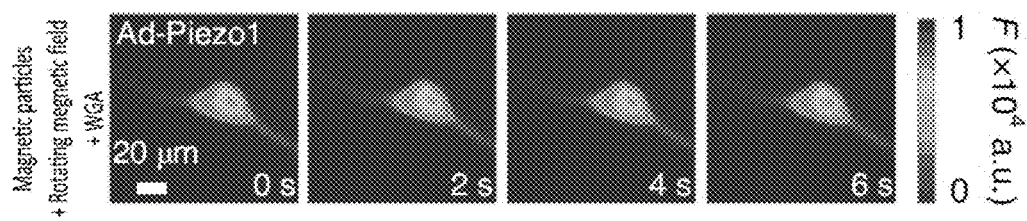

[FIG. 16]
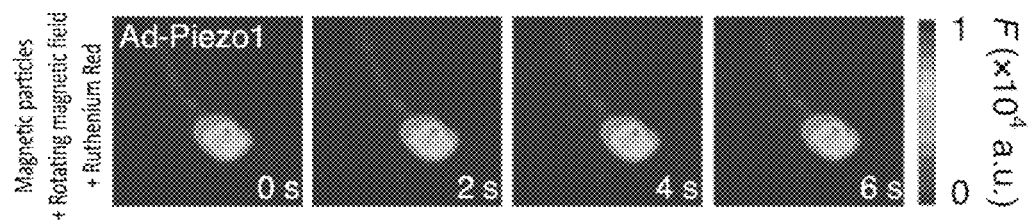

[FIG. 17]
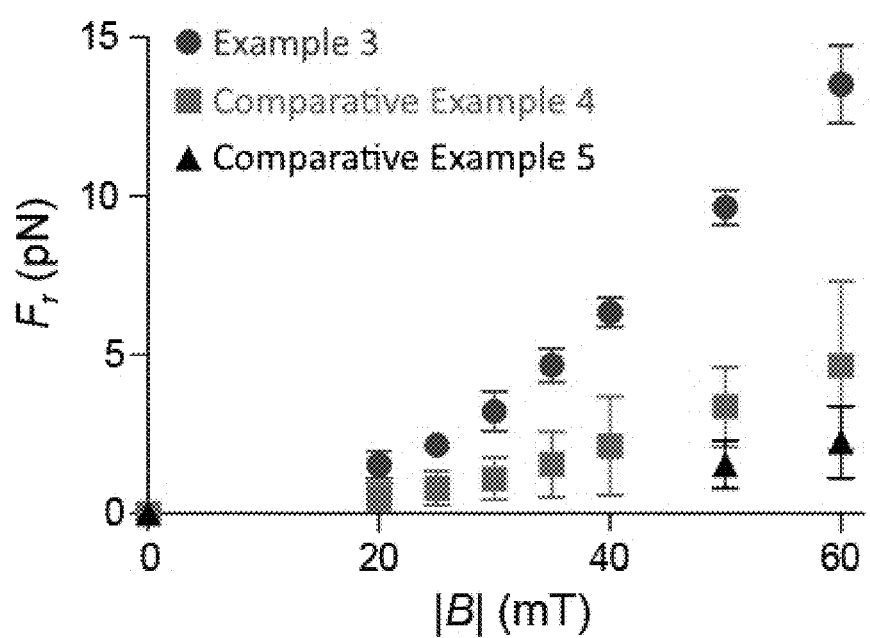

【FIG. 18】
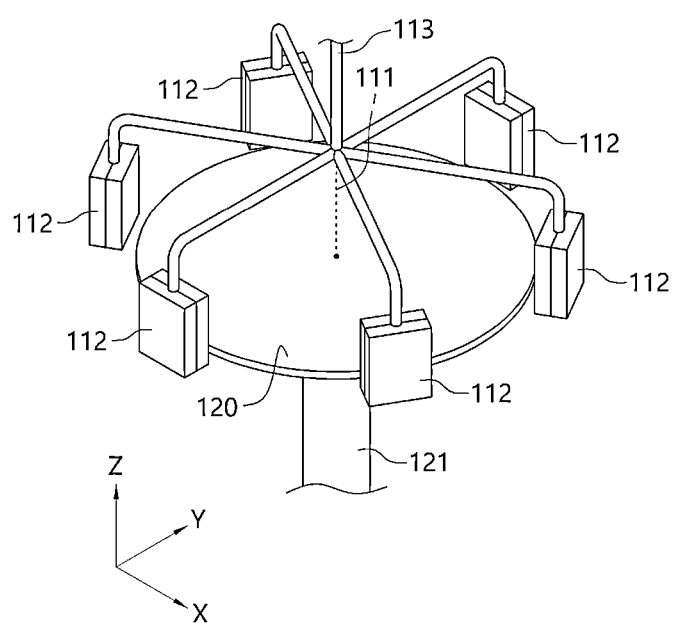

MAGNETIC PARTICLE FOR MODULATING ACTIVITY OF CELL

CROSS REFERENCE TO RELATED APPLICATIONS

This application claims priority to and the benefit of Korean Patent Application No. 10-2021-0021485, filed Feb. 17, 2021 and Korean Patent Application No. 10-2022-0020901, filed Feb. 17, 2022. The contents of the above patent applications are incorporated by reference herein in their entireties for all purposes.

Technical Field

The present invention relates to a magnetic particle for modulating the activity of cells. The present invention is derived from research conducted as part of the [IBS External Research Center] Nano-Bio Systems Convergence Science (6$^{th}$ year) (2019-11-1707) of the Ministry of Science and ICT of the Republic of Korea (Project Identification Number: 1711122878, Detailed Task Number: IBS-R026-D1-2020-A00, Project Period: Jan. 1, 2020 to Dec. 31, 2020). This application claims priority to and the benefit of Korean Patent Application No. 10-2021-0021485, filed on Feb. 17, 2021, the disclosure of which is incorporated herein by reference in its entirety.

BACKGROUND ART

Various studies have been conducted to activate physiological functions or specific cells in a living body. Among these, it is classified as optogenetics, which uses a method that can activate or inactivate a specific function or cell by light at a specific wavelength. Since such optogenetics uses a non-contact method, the possibility of tissue damage is low, and the wavelength or intensity of the irradiated light can be adjusted, and thus, the degree of freedom in experimental design is high.

However, due to the low transmittance of light, the area in which the activity can be controlled is very limited, and there is a problem in that an invasive method of locating a light source into the inside of the living body must be used in order to apply the same to the inside of the living body.

DISCLOSURE

Technical Problem

The present invention has been devised to solve the aforementioned problems, and one of the several objects of the present invention is to provide a magnetic particle for modulating the activity of cells that can modulate the activity of cells in a non-contract/non-invasive manner.

One of the several objects of the present invention is to provide a magnetic particle for modulating the activity of cells that cannot damage the living body.

Technical Solution

The magnetic particle for modulating the activity of cells according to an example of the present invention is capable of specifically binding to a bioactive material, and includes a core and a plurality of nanoparticles disposed on the surface of the core, and may generate a torque of 10 pN·nm or more when a rotating magnetic field of 5 mT is applied.

In addition, the magnetic particle may have magnetic anisotropy.

In addition, the average particle diameter of the magnetic particle may be 2.0 μm or less.

In addition, the average particle diameter of the nanoparticles may be more than 5 nm.

In addition, the nanoparticles may include at least one selected from the group consisting of iron (Fe), manganese (Mn), nickel (Ni), zinc (Zn), aluminum (Al), cobalt (Co), chromium (Cr), molybdenum (Mo), titanium (Ti), bismuth (Bi), neodymium (Nd), platinum (Pt), gold (Au), palladium (Pd), copper (Cu), alloys thereof, oxides thereof, ferrites thereof and doped ferrites thereof.

Meanwhile, the magnetic particle for modulating the activity of cells according to the present invention may further include a linker which links the core and the nanoparticles.

In an exemplary embodiment of the present invention, the bioactive material to which the magnetic particle for modulating the activity of cells may bind may be a mechanosensitive channel and/or a mechanosensitive ion channel.

The mechanosensitive channel or mechanosensitive ion channel may include at least one selected from the group consisting of Piezo1, Piezo2, TRPC1, TRPC3, TRPC6, TRPM4, TRPM7, TRPN1, TRPA1, TRPY1, TRPP1, TRPP2, TRPV1, I679K-TRPV1, TRPV2, TRPV4, TREK, TRAAK, ASIC1,2,3, MEC-4/MEC-10, MscL, MscS, RGD, integrin and cadherin.

Meanwhile, the magnetic particle for modulating the activity of cells according to the present invention may bind to the surface of the bioactive material.

In addition, the magnetic particle for modulating the activity of cells may bind to an antigen or a specific receptor located on the surface of the bioactive material.

Advantageous Effects

One of the several effects of the present invention is to provide a magnetic particle for modulating the activity of cells that can modulate the activity of cells without contacting cells or living bodies.

One of the several effects of the present invention is to provide a magnetic particle for modulating the activity of cells that can non-invasively modulate the activity of cells.

One of the several effects of the present invention is to be able to provide a magnetic particle for modulating the activity of cells that cannot damage the living body.

One of the several effects of the present invention is that it is possible to provide a magnetic particle for modulating the activity of cells that can modulate the activity of cells while maintaining the activity of the living body.

DESCRIPTION OF DRAWINGS

FIG. 1 is a mimetic diagram schematically illustrating the structure of a magnetic particle for modulating the activity of cells according to the present invention.

FIG. 2 is a set of TEM images obtained by photographing the nanoparticles attached to the surface of the magnetic particle according to the present invention.

FIG. 3 is a set of TEM images obtained by photographing the magnetic particle having nanoparticles attached to the surface of the core according to an exemplary embodiment of the present invention.

FIG. 4 is an image illustrating the simulation results for the residual magnetization of the nanoparticles at room temperature using a micromagnetism simulation program (OOMMF) and a graph of magnetism.

FIG. 5 is an image visualized by mathematically calculating the strength of a magnetic field according to changes in the number of magnetic force generating units and the longest distance between a plurality of magnetic force generating units.

FIG. 6 is an image visualized by mathematically calculating the strength of a magnetic field according to the distance from the rotation axis respectively for a case where there were six magnetic force generating units and the longest distance between the plurality of magnetic force generating units was 16 cm, and a case where there were 10 magnetic force generating units and the longest distance between the magnetic force generating units was 70 cm.

FIG. 7 is a graph showing the relationship between the size of magnetic particles and the number of magnetic particles bound to cells.

FIG. 8 is a set of TEM images obtained by photographing the movement of magnetic particles when the gradient of the magnetic field exceeded Relationship Formula 3 according to the present invention.

FIG. 9 is a set of images obtained by photographing with a fluorescence microscope the states in which a fluorescent material was attached to one part of the magnetic particles according to Example 1 of the present invention and a predetermined rotating magnetic field was applied.

FIG. 10 is a set of images obtained by photographing with a fluorescence microscope the states in which a fluorescent material was attached to one part of the magnetic particles according to Comparative Example 1 of the present invention and a predetermined rotating magnetic field was applied.

FIG. 11 is a set of immunostaining fluorescence images obtained by photographing fluorescent materials stained using the Myc antibody after expressing the Piezo1 channel in cortical neurons of mice.

FIG. 12 is a set images obtained by photographing of the distribution of magnetic particles in the cortical neurons of mice of FIG. 11 with a fluorescence microscope.

FIG. 13 is a set of images obtained by photographing $Ca^{2+}$ ion-sensitized fluorescence signals (X-Rhod-1) when the neurons of mice of FIG. 11 were placed in the rotating magnetic field generating device according to the present invention and then a rotating magnetic field was applied at a rate of 0.5 Hz.

FIG. 14 is a set of images obtained by photographing $Ca^{2+}$ ion-sensitized fluorescence signals (X-Rhod-1) when no rotating magnetic field was applied to the neurons of FIG. 11.

FIG. 15 is a set of images obtained by photographing $Ca^{2+}$ ion-sensitive fluorescence signals (X-Rhod-1) when a rotating magnetic field was applied after binding the magnetic particles to WGA, which non-specifically binds to cortical neurons of mice.

FIG. 16 is a set of images obtained by photographing $Ca^{2+}$ ion-sensitized fluorescence signals (X-Rhod-1) when a rotating magnetic field was applied after additional injection of Ruthenium Red, which inactivates the Piezo1 channel, into the neurons of mice of FIG. 11.

FIG. 17 is a graph showing the results of measuring the force generated by changing the strength of the magnetic field with respect to the magnetic particles of Example 3 and Comparative Examples 4 and 5.

FIG. 18 is a perspective diagram mimetically illustrating the rotating magnetic field generating device for applying a rotating magnetic field to the magnetic particle for modulating the activity of cells of the present invention.

MODES OF THE INVENTION

Hereinafter, exemplary embodiments of the present invention will be described with reference to specific examples and the accompanying drawings. It is not intended to limit the technology described herein to specific exemplary embodiments, and it is to be understood that various modifications, equivalents and/or alternatives of the exemplary embodiments of the present invention are included. In connection with the description of the drawings, like reference numerals may be used for like components.

In addition, in order to clearly describe the present invention in the drawings, parts that are irrelevant to the description are omitted, and the thickness is enlarged to clearly express various layers and regions, and components having the same function within the scope of the same spirit may be described by using the same reference numerals.

In the present specification, expressions such as "have", "may have", "include" or "may include" indicate the presence of a corresponding feature (e.g., a numerical value, function, operation or component such as a part). and do not exclude the presence of additional features.

In the present specification, expressions such as "A or B", "at least one of A and/and B" or "one or more of A or/and B" may include all possible combinations of the items listed together. For example, "A or B", "at least one of A and B" or "at least one of A or B" may refer to all cases of (1) including at least one A, (2) including at least one B, or (3) including at least one A and at least one B.

The present invention relates to a magnetic particle for modulating the activity of cells. The magnetic particle for modulating the activity of cells according to the present invention is capable of specifically binding to a bioactive material and includes a core and a plurality of nanoparticles disposed on the surface of the core, and may generate a torque of 10 pN·nm or more when a rotating magnetic field of 5 mT is applied.

Recent research on biological systems is progressing in various directions, and various methods for activating physiological functions or specific cells in the living body have been suggested. Optogenetics is a representative of these methods, and it has been reported that a predetermined function or cell can be activated by irradiating light at a specific wavelength to an optogenetic actuator such as channelrhodopsin.

However, unlike the point initially suggested as an advantage of optogenetics in the use of a non-contact method, the limitation of using the invasive method in the biological unit rather than the cell unit has been revealed. This is because light near the wavelength range of visible light has low penetrating power to the living body, and in order to control the activity by irradiating light to cells or organs inside the living body, there is a problem in that a light source must be located inside the living body through a method such as surgery.

On the other hand, the magnetic field has the advantage of having a high penetrating power with respect to the living body. By using this, magnetogenetics, which activates or inactivates specific functions or cells of a living body, is being studied as a new method. In the case of using a magnetic field, it is possible to apply a sufficient magnetic field even outside the living body such that irreversible damage to the living body can be fundamentally prevented.

However, the strength of the magnetic field can be explained by the magnetic flux density (B), and since the magnetic flux density is inversely proportional to the distance from the source, it is very difficult to apply a magnetic field at a certain strength to a long distance. In addition, conventional magnetic particles have a problem in that a very large magnetic field must be applied to generate a desired level of magnetic force. For this reason, existing studies on magnetic fields have mainly been conducted in a limited scope, such as implementing cell activity at a short distance or transferring heat to cells by applying an alternating magnetic field.

Accordingly, the inventors of the present invention have discovered that the activity of a target cell can be modulated in vivo by applying a rotating magnetic field in a predetermined range. The present invention has been devised from the above studies, and the magnetic particle for modulating the activity of cells according to the present invention can generate an appropriate level of torque while minimizing linear motion when a rotating magnetic field is applied, which will be described below. Through this, the magnetic particle for modulating the activity of cells according to the present invention can modulate the activity of a target cell and a living body including the same through a non-contact/non-invasive method.

The magnetic particle for modulating the activity of cells according to the present invention may generate a torque of 10.0 pN·nm or more when a rotating magnetic field satisfying the relationship formulas described below is applied. The torque generated by the magnetic particle may be transmitted to a bioactive material bound to the magnetic particle, and the activity of cells may be modulated by using the torque transmitted to the bioactive material. The upper limit of the torque generated by the magnetic particle when the rotating magnetic field is applied is not particularly limited as long as it does not damage the bioactive material, but may be, for example, 1 μN·μm or less.

In an exemplary embodiment of the present invention, the magnetic particle for modulating the activity of cells according to the present invention may include a core and a plurality of nanoparticles disposed on the surface of the core. As used herein, the term "core" may mean a region located inside a plurality of nanoparticles disposed outside the magnetic particle, and may mean a carrier having a function of supporting and/or immobilizing the plurality of nanoparticles. FIG. 1 mimetically shows the magnetic particle of the present invention. Referring to FIG. 1, the magnetic particle 1 according to the present invention may have a structure in which a core 11 is positioned therein, and a plurality of nanoparticles 12 are disposed to surround the core 11. In this case, the core 11 may have a spherical shape, but is not limited thereto. As used herein, the term "spherical" may mean a shape in which no angle exists on the outer surface, and may mean a three-dimensional figure in which cut surfaces in all directions are circular. In addition, the spherical/circular shape may include not only a perfect spherical/circular shape, but also a shape that is close to a spherical shape/elliptical shape observed from the outside. Since the magnetic particle according to the present invention has the above structure, it is possible to increase the sensitivity to the rotating magnetic field.

The core is not particularly limited as long as it can attach nanoparticles to the surface, but may include, for example, inorganic materials such as polymers, ceramics, metal matrix composites (MMC), ceramic matrix composite materials (CMC) or the like. Specific examples of the polymer may include at least one selected from the group consisting of polyamide, polyurethane, polyethylene, polypropylene, polyacetal, polycarbonate, polybutylene terephthalate (PBT), polyethylene terephthalate (PET), polyethylene naphthalate (PEN), polytrimethylene terephthalate (PTT), polyhexamethylene terephthalate, polystyrene, polyvinyl chloride, polytetrafluoroethene, polyester (e.g. polylactic acid), polyether, polyether sulfone, polyether ether ketone, polyacrylate, polymethacrylate, polyimide, acrylonitrile butadiene styrene (ABS), polyphenylene sulfide, vinyl polymer, polyarylene ether, polyarylene sulfide, polysulfone, polyether ketone, polyamide-imide, polyetherimide, polyetherester, copolymers including polyether blocks and polyamide blocks (PEBA or polyether block amide), grafted or ungrafted thermoplastic polyolefin, functionalized or non-functionalized ethylene/vinyl monomer polymer, functionalized or non-functionalized ethylene/alkyl (meth)acrylate, functionalized or non-functionalized (meth)acrylic acid polymer, functionalized or non-functionalized ethylene/vinyl monomer/alkyl (meth)acrylate terpolymer, ethylene/vinyl monomer/carbonyl terpolymer, ethylene/alkyl (meth)acrylate/carbonyl terpolymer, methylmethacrylate-butadiene-styrene (MBS)-type core-shell polymer, polystyrene-block-polybutadiene-block-poly(methyl methacrylate) (SBM) block terpolymer, chlorinated or chlorosulfonated polyethylene, polyvinylidene fluoride (PVDF), phenolic resin, poly(ethylene/vinyl acetate), polybutadiene, polyisoprene, styrene-based block copolymer, polyacrylonitrile, silicone, silica and combinations thereof, but the present invention is not limited thereto.

Specific examples of the ceramic may be exemplified by at least one selected from the group consisting of Si, Al, Mg, Zn, Ba, Co, Mn, Mo, Ni, W, Cr, Ti, Zr, B, Hf, Yb, Ce, Y, Bi, Er, Sm, Gd, Dy, V, oxides thereof, nitrides thereof and carbides thereof, but the present invention is not limited thereto. In addition, specific examples of the metal matrix composite material (MMC) and/or the ceramic matrix composite material (CMC) may be exemplified by composite matrices of the ceramic and a metal component that can be used as nanoparticles to be described below, but the present invention is not limited thereto.

A plurality of nanoparticles may be attached to the surface of the core. The plurality of nanoparticles may be magnetizable nanoparticles, and specifically, may be nanoparticles having magnetic sensitivity. The magnetic particle for modulating the activity of cells according to the present invention uses a structure in which a plurality of magnetizable nanoparticles are attached to the surface of the core such that sufficient torque may be generated even when a low-strength rotating magnetic field is applied and it is possible to effectively modulate the activity of cells.

In an exemplary embodiment of the present invention, the nanoparticles disposed on the surface of the magnetic particles may be magnetically anisotropic (magnetic anisotropy). In the present specification, magnetic anisotropy may mean a property of different magnetic permeability, which is the degree of magnetization depending on the direction of the magnetic field with respect to the crystal axis when a magnetic field is applied to the crystal of a magnetic material. In conventional magnetogenetics, a single particle is generally used as a magnetic particle. However, when a single particle is used, there is a limitation to the coercive force even if a shape such as a disk shape is used, and if the size of the magnetic particle using a magnetic material such as a metal is too large, the attached bioactive material is inevitably adversely affected. As the magnetic particles according to the present invention have a structure in which nanoparticles exhibiting magnetic anisotropy are disposed on the surface of the core as described below, a small amount of nanoparticles may be used, and it is possible to generate a large amount of torque.

The shape of the nanoparticles may be a spherical shape or a polyhedral shape. As used herein, the term "polyhedron" may mean a three-dimensional shape in which a plurality of polygons are combined, and may mean a three-dimensional structure in which a plurality of polygons are combined without a gap. In addition, the polygon may mean a shape formed by connecting a finite number of line segments, and may mean a structure having a vertex at a junction where at least two line segments meet. FIG. 2 is a set of TEM images of nanoparticles according to an exemplary embodiment of the present invention. Referring to FIG. 2, the nanoparticles of the magnetic particle according to the present invention may have, for example, an octahedral shape, but is not limited thereto. Since the nanoparticles have a polyhedral shape, it is possible to effectively exhibit magnetic anisotropy.

In an exemplary embodiment of the present invention, the average particle diameter of the nanoparticles of the magnetic particle for modulating the activity of cells according to the present invention may be more than 5 nm. The average particle diameter of the nanoparticles is not particularly limited, but may mean a D50 particle diameter measured by dynamic light scattering. The average particle diameter of the nanoparticles may be more than 5 nm, 6 nm or more, 8 nm or more, 10 nm or more, 14 nm or more, 18 nm or more, 20 nm or more, 22 nm or more, 24 nm or more or 25 nm or more, and the upper limit is not particularly limited, but may be, for example, 100 nm or less. The nanoparticles must have magnetic anisotropy, and at the same time, they must be attached to the core in a sufficient amount for the magnetic particle to generate a high torque. If the nanoparticles are too small, it is difficult to have magnetic anisotropy, and if the nanoparticles are too large, a sufficient amount of nanoparticles may not be attached to one magnetic particle, or dispersibility in a solution may be very poor during the manufacturing process.

If the nanoparticles are a material having magnetic sensitivity, the composition thereof is not particularly limited. Non-limiting examples of components that can be used as the nanoparticles may be at least one selected from the group consisting of iron (Fe), manganese (Mn), nickel (Ni), zinc (Zn), aluminum (Al), cobalt (Co), chromium (Cr), molybdenum (Mo), titanium (Ti), bismuth (Bi), neodymium (Nb), platinum (Pt), gold (Au), palladium (Pd), copper (Cu), alloys thereof, oxides thereof, ferrites thereof and doped ferrites thereof, but the present invention is not limited thereto. In addition, as iron oxide of the iron, it may be exemplified by at least one selected from the group consisting of iron(II) oxide (FeO), iron(III) oxide (magnemite; $Fe_2O_3$, $\alpha$-$Fe_2O_3$, $\beta$-$Fe_2O_3$, $\gamma$-$Fe_2O_3$, $\epsilon$-$Fe_2O_3$), magnetite ($Fe_3O_4$), iron(II, III) oxides ($Fe_4O_5$, $Fe_5O_6$, $Fe_5O_7$, $Fe_{13}O_{19}$, $Fe_{25}O_{32}$) and alloys thereof, but the present invention is not limited thereto.

In one example, the magnetic particle according to the present invention may further include a linker which links the core and the nanoparticles. The core and the nanoparticles may be coupled to each other through a linker. The term "coupling" may mean that any one material is bonded to another material, and the bonding may mean that it includes both a covalent bond and a non-covalent bond. For example, the non-covalent bond may include charge interactions, affinity interactions, metal coordination, physical adsorption, host-guest interactions, hydrophobic interactions, TT stacking interactions, hydrogen bonding interactions, van der Waals interactions, magnetic interactions, electrostatic interactions, dipole-dipole interactions and/or combinations thereof, but is not limited thereto.

The linker may include at least one selected from the group consisting of amide linkers, disulfide linkers, triazole linkers, thioether linkers, hydrazone linkers, hydrazide linkers, imine or oxime linkers, urea or thiourea linkers, amidine linkers, amine linkers and sulfonamide linkers.

In one example of the present invention, the average particle diameter of the magnetic particle for modulating the activity of cells according to the present invention may be 2.0 μm or less. In the present specification, the particle diameter (d) of the magnetic particle may mean the particle diameter of the magnetic particle to which nanoparticles are attached to the surface of the core (refer to FIG. 1). The average particle diameter of the magnetic particle is not particularly limited, but may mean, for example, a D50 particle diameter measured by dynamic light scattering. The average particle diameter of the magnetic particle may be 2.0 μm or less, 1.8 μm or less, 1.6 μm or less, 1.4 μm or less, 1.2 μm or less, or 1.0 μm or less. In addition, the lower limit of the average particle diameter of the magnetic particle is not particularly limited, but may be, for example, 50 nm or more or 100 nm or more. FIG. 7 shows the relationship between the size of magnetic particles and the number of magnetic particles bound to cells according to the present invention. Referring to FIG. 7, it can be confirmed that as the size of the magnetic particles increases, the number of magnetic particles bound to one cell decreases. This is because there is a constraint on the space for the magnetic particles to bind to the small-sized cells, and when the size of the magnetic particles is 3 μm, substantially only one or two magnetic particles can be bound to one cell. When the average particle diameter of the magnetic particles exceeds the above range, the number of magnetic particles binding to the cells may be too small, and thus, a sufficient level of torque may not be generated. In addition, if the size of the magnetic particles is too small, it may be difficult to manufacture the magnetic particles having a desired shape or it may be difficult to generate a desired level of torque.

In an exemplary embodiment of the present invention, the magnetic particle for modulating the activity of cells according to the present invention may be magnetically anisotropic (magnetic anisotropy). As described above, the magnetic particle according to the present invention has a structure in which a plurality of nanoparticles exhibiting magnetic anisotropy are disposed on the surface of the core such that the magnetic particle may have magnetic anisotropy and generate a large torque.

In one example, the magnetic particle according to the present invention may include one or more moieties for binding to the antigen or specific receptor of a bioactive material. As used herein, the term "antigen" may refer to a molecule that induces an immune response, and the immune response may include antibody production and/or activation of specific immunologically suitable cells. The antigen may be derived from an organism, a subunit of a protein/antigen, a killed or inactivated whole cell or a lysate. When the bioactive material includes an antigen, the magnetic particles may include an antibody as the moiety. As used herein, the term "antibody" may refer to a specific protein molecule directed against an antigenic site, and the term "specific binding" refers to a specific sample, for example, a nucleic acid molecule, polypeptide, or complex thereof (e.g., a binding protein, such as a transcription factor and a homologous nucleic acid binding region thereof), or compound or molecule that recognizes a given polypeptide and/or nucleic acid molecule in a biological sample and is capable of binding thereto, and at the same time substantially recognizes and not binding to another molecule. The magnetic particle for modulating the activity of cells according to the present invention includes one or more moieties for binding to the antigen or specific receptor of a bioactive material such that even when injected into the living body, the effect on other cells is minimized and only the activity of the desired cell may be selectively adjusted.

The magnetic particle of the present invention is used for modulating the activity of cells, and specifically, it may be a magnetic particle capable of binding to a bioactive material. The bioactive material may have a function of modulating the activity of cells using a torque transmitted from the magnetic particle. That is, the bioactive material according to the present invention may have a "mechanosensitive" property.

In one example of the present invention, the bioactive material may include a mechanosensitive channel or a mechanosensitive ion channel. As used herein, the term "channel" may mean a channel that can be simultaneously opened in two regions divided into an inside and an outside by a membrane or the like, and may mean a tissue that allows a predetermined solute to pass through when opened. The "mechanosensitive channel or mechanosensitive ion channel" may mean a channel that is opened or closed by mechanical stress, and the solute may be diffused by opening the channel, and through this, the activity of cells may be modulated by the solute.

The mechanosensitive channel or mechanosensitive ion channel may be at least one selected from a cation channel and an anion channel, and the cation channel and anion channel may be at least one selected from the group consisting of a calcium channel, a potassium channel, a sodium channel and a chloride channel.

In one example, the mechanosensitive channel or mechanosensitive ion channel may include at least one selected from the group consisting of Piezo1, Piezo2, TRPC1, TRPC3, TRPC6, TRPM4, TRPM7, TRPN1, TRPA1, TRPY1, TRPP1, TRPP2, TRPV1, I679K-TRPV1, TRPV2, TRPV4, TREK, TRAAK, ASIC1,2,3, MEC-4/MEC-10, MscL, MscS, RGD, integrin and cadherin. Further, in one example, the mechanosensitive channel or mechanosensitive ion channel may be Piezo1, but is not limited thereto. For example, when the channel is Piezo1, the channel may be a cation channel, and the channel may be opened according to the application of a rotating magnetic field to function to diffuse cations.

The cell of the magnetic particle for modulating the activity of cells according to the present invention may be used to encompass a single cell, a cell population, an organ, an organ explant, a tissue and a tissue explant. In addition, the cell may be used to encompass dorsal root ganglion explants, nerve cells and glial cells, but is not limited thereto.

In addition, the present invention relates to a method for modulating the activity of cells. The method for modulating the activity of cells according to the present invention may include a magnetic field application step of disposing the above-described magnetic particle inside a rotating magnetic field generating device and applying a rotating magnetic field satisfying Relationship Formulas 1 and 2 below; and a torque transmission step of transmitting a torque generated according to the application of the rotating magnetic field to the bioactive material. As used herein, the term "rotating magnetic field" may mean a magnetic field in which lines of magnetic force are rotated in a direction perpendicular to the rotation axis around a virtual rotation axis, and it may refer to a magnetic field in which the direction of the magnetic field appears to rotate with a predetermined angular velocity over time. For example, the angular velocity of the rotating magnetic field may be 0.01 Hz or more and/or 10,000 Hz or less, but is not limited thereto. In addition, in the present specification, an imaginary plane in which the magnetic flux direction of the rotating magnetic field is horizontal is defined as a "reference plane", and the "strength of magnetic field" may mean a value measured on the reference plane. In the present specification, the "distance from the rotation axis to the magnetic force generating unit" may mean an arithmetic average of distances from the rotation axis to a plurality of magnetic force generating units. In addition, although the reference plane is depicted in a disk shape in the present specification and drawings, this is a description for easily grasping the position of the reference plane, and the reference plane in the drawing may not be a tangible entity.

In this case, the rotating magnetic field may satisfy Relationship Formulas 1 and 2 below.

$$|M_c| \geq 1 \text{ mT} \qquad \text{[Relationship Formula 1]}$$

$$|M_{75} - M_c|/D_{75} \leq 5.0 \text{ T/m} \qquad \text{[Relationship Formula 2]}$$

In Relationship Formulas 1 and 2 above, $M_c$ is the strength of the magnetic field at the position of the rotation axis, $D_{75}$ is the distance from the rotation axis to the 75% position of the distance to the magnetic force generating unit, and $M_{75}$ is the strength of the magnetic field at the position $D_{75}$.

Relationship Formula 1 relates to the strength of the magnetic field at the position of the rotation axis. The system for modulating the activity of cells according to the present invention generates a torque using a rotating magnetic field, and as the direction of magnetic flux rotates, the torque can be transmitted to the bioactive material through magnetic particles bound to the bioactive material. In this case, the strength of the magnetic field becomes weaker as it moves away from the magnetic force generating unit, but when Relationship Formula 1 above is satisfied, a torque having at least a certain level may be generated even in the central part of the rotating magnetic field generating device, and through this, it is possible to modulate the activity of cells.

Relationship Formula 2 shows the relationship between the strength of the magnetic field at the position of the rotation axis and the strength of the magnetic force at the 75% position of the distance from the rotation axis to the magnetic force generating unit. Looking at Relationship Formula 2 above, the rotational magnetic field satisfying Relationship Formula 2 has a change rate of the strengths of the magnetic field up to the 75% position of the distance from the rotation axis to the magnetic force generating unit, that is, the gradient of the strength of the magnetic field according to the distance from the rotation axis may satisfy 5.0 T/m or less. This may mean that the change value of the strengths of the rotating magnetic field formed by the rotating magnetic field generating device of the system for modulating the activity of cells according to the present invention is not large. When Relationship Formula 2 above is satisfied, it is possible to form a uniform rotating magnetic field in the region up to a predetermined distance from the central part, thereby maximizing the internal space of the rotating magnetic field generating device, and through this, it is possible to modulate the activity of cells over a wide area.

In addition, the rotating magnetic field formed by the rotating magnetic field generating device may further satisfy Relationship Formula 3 below.

$$|M_{50}-M_c|/D_{50} \leq 1 \text{ T/m} \quad \text{[Relationship Formula 3]}$$

In Relationship Formula 3 above, $M_c$ is the strength of the magnetic field at the position of the rotation axis, $D_{50}$ is the distance from the rotation axis to the 50% position of the distance to the magnetic force generating unit, and $M_{50}$ is the strength of the magnetic field at the position $D_{50}$.

Relationship Formula 3 relates to the strength of the magnetic field at the position of the rotation axis and the strength of the magnetic field in the middle region between the position of the rotation axis and the magnetic force generating unit. In the rotating magnetic field satisfying Relationship Formula 3 above, the slope of the strength of the magnetic field according to the distance from the rotation axis may satisfy 1.0 T/m or less. When Relationship Formula 3 above is satisfied, the strength of the magnetic field may be substantially constant in the central region around the rotation axis. The rotating magnetic field generating device can apply a uniform rotating magnetic field with a very small change in the strength of the magnetic field to a region having a certain area or more of the internal space by forming a rotating magnetic field that satisfies Relationship Formula 3 above, and through this, it may be possible to precisely modulate the activity of cells over a wide area.

In one example of the present invention, the rotating magnetic field formed by the rotating magnetic field generating device of the present invention may further satisfy Relationship Formula 4 below.

$$|M_{75}-M_{50}|/(D_{75}-D_{50}) \leq 10 \text{ T/m} \quad \text{[Relationship Formula 4]}$$

In Relationship Formula 4 above, $D_{75}$ is the distance from the rotation axis to the 75% position of the distance to the magnetic force generating unit, $D_{50}$ is the distance from the rotation axis to the 50% position of the distance to the magnetic force generating unit, $M_{75}$ is the strength of the magnetic field at the position $D_{75}$, and $M_{50}$ is the strength of the magnetic field at the position $D_{50}$.

Relationship Formula 4 relates to the strength of the magnetic force at the 75% position of the distance from the rotation axis to the magnetic force generating unit, and the strength of the magnetic force at the 50% position of the distance from the rotation axis to the magnetic force generating unit. If aforementioned Relationship Formulas 2 and 3 relate to the change rate of the strengths of the magnetic field in the central portion of the rotating magnetic field generating device, Relationship Formula 4 above represents the change rate of the strengths of the magnetic field in the outer portion of the rotating magnetic field generating device. When Relationship Formula 3 above is satisfied, the change rate of the strengths of the magnetic field in the outer portion of the internal space of the rotating magnetic field generating device may be suppressed within a predetermined range, and it is possible to modulate the activity of cells in a wider space.

In one example, the rotating magnetic field formed by the rotating magnetic field generating device for modulating the activity of cells according to the present invention may satisfy Relationship Formula 1 described above and may satisfy at least one or more of Relationship Formulas 2 to 4 at the same time. When the rotating magnetic field of the rotating magnetic field generating device according to the present invention satisfies Relationship Formula 1 and satisfies at least one or more of Relationship Formulas 2 to 4 at the same time, the variation in the strength of the magnetic field applied to the internal space of the rotating magnetic field generating device may be reduced, and thus, it is possible to apply a magnetic field having constant strength to a large area.

FIG. 18 is a perspective diagram mimetically illustrating the rotating magnetic field generating device of the present invention. Referring to FIG. 18, the rotating magnetic field generating device of the system and method for modulating the activity of cells according to the present invention forms a rotating magnetic field with a virtual reference line as a rotation axis 111, and may include an internal space in which a plurality of magnetic force generating units 112 that are spaced apart from the rotation axis 111; and a living body can be disposed, and the reference plane 120 on which the magnetic force lines of the rotating magnetic field are horizontal may be located in the internal space.

The rotating magnetic field generating device according to the present invention may include a plurality of magnetic force generating units 112. For example, the number of the magnetic force generating units 112 may be 2 or more, 3 or more, 4 or more, 5 or more or 6 or more, but is not limited thereto. However, the magnetic force generating unit 112 must be arranged to form a rotating magnetic field, and specifically, the magnetic force generating unit 112 must be arranged such that the magnetic force line indicating the direction of the magnetic field passes on the rotation axis 111. In addition, the upper limit of the number of the magnetic force generating units 112 is not particularly limited as long as it can form a rotating magnetic field that satisfies the above-described relationship formulas, and it may be, for example, 50 or less.

FIG. 5 is a visualization of mathematical calculations of the strength of magnetic fields according to changes in the number of magnetic force generating units and the longest distance between a plurality of magnetic force generating units (hereinafter, referred to as the "long axis" of the rotating magnetic field generating device). Referring to FIG. 17, it can be confirmed that it is very difficult to form a magnetic field with uniform strength when the number of magnets of the rotating magnetic field generating device was two and the length of the long axis was 8 cm, and when the number of magnets was two and the length of the long axis was 12 cm, it can be confirmed that a region in which the strength of the magnetic field was maintained constant was formed to some extent. On the other hand, when the number of magnets was 4 or 6 and the length of the long axis was 16 cm, it can be seen that a magnetic field with uniform strength was formed in a very wide area. In addition, referring to FIG. 6, when the number of magnets was 10 and the length of the long axis was 70 cm, it can be seen that a uniform rotating magnetic field could be formed in a very wide range, compared to the case where 6 magnets were used and the length of the long axis was 16 cm. The rotating magnetic field generating device according to the present invention can modulate the activity of cells over a wide area by forming a uniform rotating magnetic field that does not have a large change in strength inside the device as described above. Detailed experimental data will be described below through the examples.

In an exemplary embodiment of the present invention, the area of the rotating magnetic field satisfying at least one of Relationship Formulas 2 to 4 while satisfying above-described Relationship Formula 1 may be 0.1 $cm^2$ or more. Conventional rotating magnetic field generating devices have a limitation in that the strength of the magnetic field according to the location is significantly different even if it forms a rotating magnetic field over a wide area applicable to the DNA level or a rotating magnetic field over a wide area. Due to this, even if a rotating magnetic field is used, it can be applied to a very narrow area or can be applied only to a field that is less affected even if the strength of the magnetic field is greatly changed. As described above, the rotating magnetic field generating device according to the present invention has a plurality of magnetic force generating units, and can form a uniform rotating magnetic field over a large area by adjusting the distance between the plurality of magnetic force generating units.

The area of the rotating magnetic field satisfying at least one of Relationship Formulas 2 to 4 while satisfying above-mentioned Relationship Formula 1 may be 0.1 $cm^2$ or more. 0.2 $cm^2$ or more, 0.3 $cm^2$ or more, 0.4 $cm^2$ or more, 0.5 $cm^2$ or more, 0.6 $cm^2$ or more, 0.7 $cm^2$ or more, 0.8 $cm^2$ or more, 0.9 $cm^2$ or more or 1.0 $cm^2$ or more, but is not limited thereto. In addition, the upper limit of the area of the rotating magnetic field satisfying the above relationship formulas is not particularly limited, but may be, for example, 10 $m^2$ or less. Since the rotating magnetic field generating device of the present invention can form a uniform rotating magnetic field over a large area, even when a target to activate cells by applying a rotating magnetic field is a living body, it is possible to modulate the activity of cells while maintaining the activity of the living body.

Since the descriptions of the configuration and operation of the rotating magnetic field applying device are the same as those described above, they will be omitted.

The magnetic particle of the method for modulating the activity of cells according to the present invention may generate a torque of 10 pN·nm or more, when a rotating magnetic field satisfying at least one of Relationship Formulas 2 to 4 is satisfied while satisfying Relationship Formula 1 described above.

The method for modulating the activity of cells according to the present invention may include a torque transmission step of transmitting a torque generated according to the application of a rotating magnetic field to a bioactive material bound to magnetic particles. The torque transmission step may be a step in which a torque generated from magnetic particles according to the application of a rotating magnetic field is transmitted through a surface of the bioactive material to which the magnetic particles are bound. In this case, the magnetic particle may be attached to the surface of the bioactive material.

In this case, the mechanosensitive channel and/or mechanosensitive ion channel of the method for modulating the activity of cells according to the present invention may be opened or closed according to the application of a rotating magnetic field. The method for modulating the activity of cells according to the present invention may open or close the mechanosensitive channel and/or mechanosensitive ion channel by applying a rotating magnetic field.

Meanwhile, according to an exemplary embodiment of the present invention, the method for modulating the activity of cells of the present invention may further include a magnetic particle attachment step performed before the magnetic field application step. The magnetic particle attachment step may be a step of binding the magnetic particle to a specific receptor or antigen on the bioactive material. The magnetic particle attachment step may be performed in vivo or ex vivo. For example, the magnetic particle attachment step may be performed in such a way that the antibody attached to the surface of the magnetic particle and the antigen expressed on the bioactive material bind, but is not limited thereto. By allowing the magnetic particles to bind to a specific receptor or antigen on the bioactive material as described above, the magnetic particle may be bound to the desired bioactive material, and at the same time, binding of the magnetic particle to a region other than the desired bioactive material is inhibited, and thus, it is possible to selectively modulate the activity of the target cell.

Further, in an exemplary embodiment of the present invention, the method for modulating the activity of cells according to the present invention may further include a step of activating cells using the torque transmitted to the bioactive material. As described above, the method for modulating the activity of cells according to the present invention receives the torque generated by the application of a rotating magnetic field and opens the mechanosensitive channel and/or mechanosensitive ion channel such that the solute may be diffused through the channel, and for example, cells that respond to the solute may be activated or deactivated. Alternatively, the concentration of the solute, which was maintained constant through the open mechanosensitive channel and/or mechanosensitive ion channel, may be adjusted such that the concentration of the solute is different in each region in both directions of the channel by closing the channel.

In this case, the cells activated in the step of activating the cells may include nerve cells, glial cells, immune cells and/or cancer cells.

Hereinafter, the present invention will be described in more detail through the examples and comparative examples. However, the spirit of the present invention is not limited to the exemplary embodiments to be described below.

Magnetic Particle

Magnetic particles were prepared in the following way. Spherical polystyrene having an average particle diameter of 500 nm was used as a core (manufactured by Polysciences), and iron oxide ($Fe_3O_4$) having an average particle diameter of 25 nm and an inverted spinel structure having an octahedral shape was prepared and used as nanoparticles. FIG. 2 is a set of TEM images of the nanoparticles used in the synthesis of the magnetic particles. Referring to FIG. 2, it can be confirmed that the nanoparticles had an octahedral shape. FIG. 4 is a simulation result of the residual magnetization of nanoparticles at room temperature using the micromagnetism simulation program (OOMMF). Referring to FIG. 4, it can be confirmed that the nanoparticles had magnetic anisotropy.

1 mg of the nanoparticles was dispersed in dimethyl sulfoxide (DMSO), and 0.1 mg of 1,2,3-triazole azido-dPEG24-TFP ester (manufactured by Quantabiodesign) was added to bind the nanoparticles and azide. Afterwards, 0.5 mg of the polystyrene core was dispersed in DMSO, and 1 mg of DBCO-PEG4-NHS (manufactured by Click Chemistry Tools) was added to bind DBCO to the polystyrene core. Each particle was separated by centrifugation and stirred at 25° C. for 8 hours to form 1,2,3-triazole, thereby preparing magnetic particles having nanoparticles attached to the surface of the polystyrene core. FIG. 3 is a set of TEM images obtained by photographing the prepared magnetic particles. Referring to FIG. 3, it can be confirmed that the iron oxide nanoparticles were attached to the surface of the polystyrene core.

Rotating Magnetic Field Generating Device

FIG. 18 is a mimetic diagram of the rotating magnetic field generating device according to the present invention. The rotating magnetic field generating device was manufactured to have a different number of magnets and a different interval between the long axes. The rotating magnetic field generating device was manufactured such that the space in the center does not rotate even when the external magnet rotates. The strengths of the magnetic field measured by varying the number of magnets and the distance between the major axes in the manufactured rotating magnetic field generating device are shown in Table 1 below.

surfaces of the aforementioned magnetic particles. After the magnetic particles to which the fluorescent material was attached were placed in the central region of the rotating magnetic field generating device, a magnetic field of 25 mT was applied and the external magnet was rotated at a speed of 0.5 Hz.

TABLE 1

| Classification (Distance of long axis/ number of magnets) | Strength of magnetic field (mT) | | | Change in magnetic field (Δ) (mT) | | | Change rate of magnetic field (T/m) | | |
|---|---|---|---|---|---|---|---|---|---|
| | $\|M_c\|$ | $\|M_{50}\|$ | $\|M_{75}\|$ | $\|M_{75} - M_c\|$ | $\|M_{50} - M_c\|$ | $\|M_{75} - M_{50}\|$ | $\|M_{75} - M_c\|/\Delta x$ | $\|M_{50} - M_c\|/\Delta x$ | $\|M_{75} - M_{50}\|/\Delta x$ |
| 8 cm/ 2 magnets | 53 | 102 | 206 | 153 | 49 | 104 | 5.1 | 2.45 | 10.4 |
| 12 cm/ 2 magnets | 21 | 50 | 136 | 115 | 29 | 86 | 2.56 | 0.97 | 5.73 |
| 16 cm/ 2 magnets | 13 | 33 | 104 | 91 | 20 | 71 | 1.52 | 0.5 | 3.55 |
| 16 cm/ 4 magnets | 15 | 29 | 92 | 77 | 14 | 63 | 1.28 | 0.35 | 3.15 |
| 16 cm/ 6 magnets | 25 | 36 | 88 | 63 | 11 | 52 | 1.05 | 0.275 | 2.6 |
| 70 cm/ 10 magnets | 26 | 45 | 100 | 74 | 19 | 55 | 0.282 | 0.109 | 0.63 |

Referring to Table 1, when the lengths of the long axes were 12 cm, 16 cm and 70 cm, respectively, it can be confirmed that all of Relationship Formula 1 to 4 were satisfied even if only two magnets were disposed. However, when the length of the long axis was 8 cm and two magnets were used, it can be seen that the strength of the magnetic field changed rapidly as it moved away from the position of the rotation axis. In particular, it showed a very large change rate of the magnetic field with respect to Relationship Formula 3.

FIG. 8 is the results of placing magnetic particles in the rotating magnetic field generating device when the length of the long axis was 8 cm and two magnets were used. Referring to FIG. 8, when a magnetic field having a greater change rate of magnetic field was applied compared to Relationship Formula 3, it can be confirmed the physical position itself changed along the direction of magnetic flux, rather than causing the magnetic particles to rotate to generate torque. This may mean that when the rotating magnetic field does not satisfy any one or more of Relationship Formulas 2 to 4, the magnetic particles do not generate torque. In this case, it is not possible to transmit a torque at a required degree to the bioactive material, and only a weak linear magnetic force is applied such that it may not be possible to modulate the activity of the cell. In addition, when the force that changes the position along the magnetic flux direction is strong, it may damage the bioactive material to which the magnetic particles are bound, and further may cause irreversible damage to the cell itself.

Example 1

In order to confirm the action of the magnetic particles and the rotating magnetic field generating device, a fluorescence material (fluorescence probe green, 100 nm, manufactured by Sigma-Aldrich) was attached to one of the Comparative Example 1

The same magnetic particles as in Example 1 were used except that a linear magnetic field generating device was used, and it was observed after applying a magnetic field at the same strength (25 mT).

FIG. 9 is a set of images of the magnetic particles according to Example 1 of the present invention photographed with a fluorescence microscope, and FIG. 10 is a set of images of the magnetic particles according to Comparative Example 1 photographed with a fluorescence microscope. In FIGS. 9 and 10, white circles in the center indicate an outline of the magnetic particle. Referring to FIG. 9, according to Example 1 of the present invention, it can be confirmed that the magnetic particles rotated with time. In addition, it can be confirmed that it took about 2 seconds for the magnetic particles to rotate once (360°). This indicates that the magnetic particles may be rotated at a desired speed in the configuration according to Example 1 of the present invention, and thus, it can be seen that torque may be transmitted.

On the other hand, referring to FIG. 10, it can be confirmed that the magnetic particles did not move according to Comparative Example 1 of the present invention. This means that the position of magnetic particles cannot be changed even if a linear magnetic field at the same strength as the rotating magnetic field is applied, and even if the same magnetic particles are moved, it may mean that a linear magnetic field with greater strength than the rotating magnetic field is required. In addition, it may mean that a sufficient torque cannot be generated only by a linear magnetic field rather than a rotating magnetic field.

Example 2

In order to confirm the activity in neurons, the pENTCMV-Myc897-Piezo1 gene capable of expressing the Piezo1 channel was injected into adenovirus, which was then infected in the cortical neurons of mice. FIG. 11 is a set of immunostaining fluorescence images obtained by photographing a fluorescent material stained with the Myc antibody in the Piezo1 channel. Referring to FIG. 11, it can be confirmed that the Piezo1 channel was expressed in a sufficient amount in the cortical neurons of mice by the injected adenovirus.

Afterwards, in order to attach the magnetic particles to the Piezo1 ion channel, the Myc antibody was attached to the surface of the magnetic particles described above by using EDC/NHS chemistry and Protein A. Afterwards, a saline solution containing magnetic particles was injected, and sufficient time was allowed such that it was sufficiently introduced into the cortical neurons of the mice.

FIG. 12 is a set of images obtained by photographing the distribution of magnetic particles in cortical neurons of the rat with a fluorescence microscope. Referring to FIG. 12, it can be confirmed that the fluorescence signal of the magnetic particles was detected in the neurons expressing Piezo1. Through this, it can be confirmed that the injected magnetic particles were arranged by targeting the Piezo1 channel.

Comparative Example 2

Magnetic particles were injected into neurons and a rotating magnetic field was applied to the neurons under the same conditions as in Example 2, except that the magnetic particles were not bound to the Piezo1 channel but were bound to WGA, which non-specifically binds to the cell surface.

Comparative Example 3

Magnetic particles were bound to the Piezo1 channel and a rotating magnetic field was applied in the same manner as in Example 2, except that Ruthenium Red for inactivating the Piezo1 channel was additionally injected.

FIG. 13 is a set of images obtained by photographing $Ca^{2+}$ ion-sensitized fluorescence signals (X-Rhod-1) when a rotating magnetic field was applied at a rate of 0.5 Hz after placing the neurons of Example 2 in the above-described rotating magnetic field generating device, and FIG. 14 is a set of images obtained by photographing $Ca^{2+}$ ion-sensitized fluorescence signals (X-Rhod-1) when no rotating magnetic field was applied to the neurons of Example 2 above. Regions marked in red in FIGS. 13 and 14 indicate regions in which $Ca^{2+}$ ions were activated. Referring to FIG. 13, it can be confirmed that $Ca^{2+}$ ions were released, when the rotating magnetic field according to the present invention was applied. In addition, referring to FIG. 14, even when the magnetic particles according to the present invention were injected into neurons, it can be confirmed that $Ca^{2+}$ ions were not activated if a rotating magnetic field was not applied. Through this, it can be confirmed that $Ca^{2+}$ ions were released only when a rotating magnetic field was applied to the neuron to which the magnetic particles were attached, rather than the magnetic particles were attached to the neurons to release $Ca^{2+}$ ions.

On the other hand, in the case of Comparative Example 2, there was no change in the $Ca^{2+}$ activity. FIG. 15 is a set of images obtained by photographing the $Ca^{2+}$ ion-sensitized fluorescence signals of Comparative Example 2. Referring to FIG. 15, it can be seen that $Ca^{2+}$ ions were not activated even when the same rotating magnetic field was applied when the magnetic particles were not coupled to the Piezo1 channel.

Further, in Comparative Example 3, there was no change in the $Ca^{2+}$ activity. FIG. 16 is a set of images obtained by photographing the $Ca^{2+}$ ion-sensitized fluorescence signals of Comparative Example 3. Referring to FIG. 16, it can be seen that even if the magnetic particles were coupled to the Piezo1 channel, $Ca^{2+}$ ions were not activated even when the same rotating magnetic field was applied when the Piezo1 channel was inactivated by injecting Ruthenium Red.

When a predetermined rotating magnetic field was applied to the magnetic particles according to Example 1 described above, it can be confirmed that the magnetic particles rotated. Further, in the case of Example 2, it can be seen that when a predetermined rotating magnetic field was applied, the Piezo1 channel was activated. Further, in the case of Example 2 in which the magnetic particles were coupled to Piezo1, it can be confirmed that $Ca^{2+}$ ions were released by rotation of the magnetic particles. In addition, through Comparative Example 3, it can be confirmed that the Piezo1 channel functioned as a $Ca^{2+}$ ion channel.

Therefore, in the case of Example 2 in which Piezo1 and magnetic particles were coupled, magnetic particles rotated according to the application of a rotating magnetic field to generate torque, and the torque was transmitted to the Piezo1 channel coupled with the magnetic particles, and as the Piezo1 channel opened, it can be confirmed that $Ca^{2+}$ ions were released.

Example 3 and Comparative Examples 4 and 5

For the same magnetic particles as those used in Example 1, the force generated by changing the strength of the magnetic field was measured. The force was measured by observing the maximum speed ($\omega_{max}$) of particle rotation through a fluorescence microscope ($\tau=8\pi\eta r^3\omega_{max}$). For comparison, Comparative Example 4 (ThermoFisher, Dynabead MyOne) and Comparative Example 5 (Spherotech, Carboxyl superparamagnetic particles) using nanoparticles exhibiting magnetic isotropy were used in the same manner to measure the change in the forces according to the strength of the magnetic field. The magnetic particles used in Comparative Example 4 had a structure in which nanoparticles (iron oxide) were uniformly dispersed inside spherical polystyrene, and the magnetic particles used in Comparative Example 5 had a structure in which iron oxide layers and polystyrene layers were alternately stacked on a spherical polystyrene core.

FIG. 17 shows the results of Example 3 and Comparative Examples 4 and 5. Referring to FIG. 17, it can be confirmed that, unlike Comparative Examples 4 and 5 using nanoparticles exhibiting magnetic isotropy, the magnetic particles of the present invention can transmit a very large force even when the same amount is used.

In particular, it can be seen that Comparative Example 4, which had a structure in which a plurality of iron oxide particles were dispersed in a spherical polystyrene bead, generated a lower level of force compared to Example 3 even though the structure included a plurality of iron oxide nanoparticles. Further, in the case of Comparative Example 5, which had an iron oxide layer surrounding the spherical core, it can be confirmed that only a very low level of torque was generated compared to Example 3 even though the iron oxide shell was disposed outside the core.

Although the exemplary embodiment of the present invention has been described in detail above, the present invention is not limited by the above-described exemplary embodiment and the accompanying drawings, but is intended to be limited by the appended claims. Accordingly, various types of substitution, modification and change will be possible by those skilled in the art within the scope not departing from the technical spirit of the present invention described in the claims, and it is also said that these fall within the scope of the present invention.

EXPLANATION OF REFERENCE NUMERALS

11: Core
12: Nanoparticles
111: Rotation axis
112: Magnetic field generating device
121: Support

The invention claimed is:

1. A magnetic particle for modulating the activity of cells, which is capable of specifically binding to a bioactive material, the magnetic particle comprising:
 a core; and
 a plurality of nanoparticles disposed on the surface of the core,
 wherein the magnetic particle generates a torque of 10 pN·nm or more when a rotating magnetic field of 5 mT is applied, and
 wherein the average particle diameter of the nanoparticles is more than 5 nm.

2. The magnetic particle of claim 1, wherein the nanoparticles comprise at least one selected from the group consisting of iron (Fe), manganese (Mn), nickel (Ni), zinc (Zn), aluminum (Al), cobalt (Co), chromium (Cr), molybdenum (Mo), titanium (Ti), bismuth (Bi), neodymium (Nd), platinum (Pt), gold (Au), palladium (Pd), copper (Cu), alloys thereof, oxides thereof, ferrites thereof and doped ferrites thereof.

3. The magnetic particle of claim 1, further comprising a linker which links the core and the nanoparticles.

4. The magnetic particle of claim 1, wherein the magnetic particle has magnetic anisotropy.

5. The magnetic particle of claim 1, wherein the average particle diameter of the magnetic particle is 2.0 μm or less.

6. The magnetic particle of claim 1, wherein the bioactive material is a mechanosensitive channel and/or a mechanosensitive ion channel.

7. The magnetic particle of claim 6, wherein the mechanosensitive channel or mechanosensitive ion channel comprises at least one selected from the group consisting of Piezo1, Piezo2, TRPC1, TRPC3, TRPC6, TRPM4, TRPM7, TRPN1, TRPA1, TRPY1, TRPP1, TRPP2, TRPV1, I679K-TRPV1, TRPV2, TRPV4, TREK, TRAAK, ASIC1,2,3, MEC-4/MEC-10, MscL, MscS, RGD, integrin and cadherin.

8. The magnetic particle of claim 1, wherein the magnetic particle binds to the surface of the bioactive material.

9. The magnetic panicle of claim 8, wherein the magnetic particle binds to an antigen or a specific receptor located on the surface of the bioactive material.

10. A magnetic particle for modulating the activity of cells, which is capable of specifically binding to a bioactive material, the magnetic particle comprising:
 a core; and
 a plurality of nanoparticles disposed on the surface of the core,
 wherein the magnetic particle generates a torque of 10 pN·nm or more when a rotating magnetic field of 5 mT is applied, and
 wherein the bioactive material is a mechanosensitive channel and/or a mechanosensitive ion channel.

11. The magnetic particle of claim 10, wherein the average particle diameter of the nanoparticles is more than 5 nm.

12. The magnetic particle of claim 10, wherein the nanoparticles comprise at least one selected from the group consisting of iron (Fe), manganese (Mn), nickel (Ni), zinc (Zn), aluminum (Al), cobalt (Co), chromium (Cr), molybdenum (Mo), titanium (Ti), bismuth (Bi), neodymium (Nd), platinum (Pt), gold (Au), palladium (Pd), copper (Cu), alloys thereof, oxides thereof, ferrites thereof and doped ferrites thereof.

13. The magnetic particle of claim 10, further comprising a linker which links the core and the nanoparticles.

14. The magnetic particle of claim 10, wherein the magnetic particle has magnetic anisotropy.

15. The magnetic particle of claim 10, wherein the average particle diameter of the magnetic particle is 2.0 μm or less.

16. The magnetic particle of claim 10, wherein the mechanosensitive channel or mechanosensitive ion channel comprises at least one selected from the group consisting of Piezo1, Piezo2, TRPC1, TRPC3, TRPC6, TRPM4, TRPM7, TRPN1, TRPA1, TRPY1, TRPP1, TRPP2, TRPV1, I679K-TRPV1, TRPV2, TRPV4, TREK, TRAAK, ASIC1,2,3, MEC-4/MEC-10, MscL, MscS, RGD, integrin and cadherin.

17. The magnetic particle of claim 10, wherein the magnetic particle binds to the surface of the bioactive material.

18. The magnetic panicle of claim 17, wherein the magnetic particle binds to an antigen or a specific receptor located on the surface of the bioactive material.

* * * * *